(12) United States Patent
Springer et al.

(10) Patent No.: US 6,404,865 B1
(45) Date of Patent: Jun. 11, 2002

(54) DOMESTIC TO COUNTRY CALL INTERCEPT PROCESS (CIP)

(75) Inventors: Arthur L. Springer, Waterloo, IA (US); Dean Marchand, Brighton, CO (US)

(73) Assignee: WorldCom, Inc., Clinton, MS (US)

( * ) Notice: Subject to any disclaimer, the term of this patent is extended or adjusted under 35 U.S.C. 154(b) by 0 days.

(21) Appl. No.: 09/464,787

(22) Filed: Dec. 17, 1999

(51) Int. Cl.[7] .............................................. H04M 15/00
(52) U.S. Cl. ............................. 379/114.14; 379/114.15; 379/114.17; 379/114.19; 379/115.01
(58) Field of Search ................................ 379/145, 144, 379/189, 194, 195, 188, 114

(56) References Cited

U.S. PATENT DOCUMENTS

| | | | |
|---|---|---|---|
| 5,345,595 A | | 9/1994 | Johnson et al. ............. 455/410 |
| 5,463,681 A | | 10/1995 | Vaios et al. .................. 379/189 |
| 5,566,234 A | * | 10/1996 | Reed et al. .................. 379/188 |
| 5,602,906 A | | 2/1997 | Phelps ..................... 379/114.14 |
| 5,638,431 A | | 6/1997 | Everett et al. ........ 379/114.28 |
| 5,768,354 A | * | 6/1998 | Lange et al. ................ 379/198 |
| 5,805,686 A | * | 9/1998 | Moller et al. ............... 379/198 |
| 5,809,125 A | * | 9/1998 | Gammino .................... 379/189 |
| 5,867,566 A | | 2/1999 | Hogan et al. .......... 379/115.01 |
| 5,875,236 A | * | 2/1999 | Jankowitz et al. .......... 379/114 |
| 5,907,602 A | | 5/1999 | Peel et al. ............... 379/114.14 |
| 5,970,405 A | * | 10/1999 | Kaplan et al. .............. 455/410 |
| 5,988,497 A | * | 11/1999 | Wallace .................... 235/382.5 |
| 6,163,604 A | * | 12/2000 | Baulier et al. .............. 379/189 |

* cited by examiner

Primary Examiner—Ahmad F. Matar
Assistant Examiner—Hector Agdeppa

(57) ABSTRACT

The invention includes a system and method for detecting fraudulent calling card calls to predefined high fraud countries including a call-intercept system capable of verifying call identities in order to prevent fraudulent calling card use.

2 Claims, 3 Drawing Sheets

DOMESTIC TO COUNTRY CALL INTERCEPT PROCESS (CIP)

BACKGROUND OF THE INVENTION

1. Field of the Invention

The present invention relates to the field of telecommunications, and, particularly, a call-intercept system and method implemented for long distance telephone systems that verifies call identities in order to prevent fraudulent calling card usage.

2. Description of the Prior Art

The telecommunication industry has estimated fraud losses are costing telecommunication service providers five (5) billion dollars per year. Particularly, telecommunication fraud losses are attributed to lost, stolen, or compromised portable calling card products, e.g., in highly populated areas. Calling card products may be compromised in various ways, for example, via social engineering, "shoulder surfing", etc., whereby a perpetrator obtains a physical calling card or calling card number belonging to another. Primarily, the perpetrator utilizes the stolen calling card/card number to place a call to a desired location or termination, whether domestic or international.

Residential customers of large telecommunication service providers, e.g., MCI WorldCom, are typically the prey for these types of fraud, and, industry studies have determined that the fraud losses will only increase in the future.

It would be highly desirable to provide telecommunications service providers with the ability to control and prevent fraudulent calling card usage while minimizing the impact to the customer.

SUMMARY OF THE INVENTION

The present invention is directed to a call intercept process (CIP) that functions to intercept callers calling for a first time to predefined high fraud countries, in order to verify the identity of the caller. In operation, a perpetrator who has obtained a calling card product, i.e., the physical calling card or the calling card number itself, and attempts to terminate a calling card call to a predefined international destination that is considered high fraud risk, will first default to an manual operator or automated response unit (operator). The operator or unit will prompt the caller for the name and account information as it appears on the calling card owner's billing account. The operator will fail the call if the perpetrator disconnects the call or is unable to provide correct name and address billing information as it appears on the account. If the caller fails or hangs up, the card is placed in a "locked status" mode and will be intercepted regardless of the termination location until such time the caller passes an account verification requirement. This process will be repeated for each calling card usage attempt until, the correct account verification is given. After a predetermined number of attempts at making a call are made, further calls will be defaulted to a second level operator who may further verify the caller's identity.

During this process, once the caller passes by giving the correct verification information, the CIP process places the card in a database and the card is over-ridden and will not be interrupted with intercept on future calls.

Advantageously, passed and failed call intercept calls may generate alarms for monitoring by a fraud control system. The fraud control system will review the alarms to determine if actions are warranted to block the calling card.

DETAILED DESCRIPTION OF THE PREFERRED EMBODIMENTS

Call intercept is the process of intercept callers, calling for the first time to predefined high fraud countries, in order to verify the identity of the caller.

Figure 1:
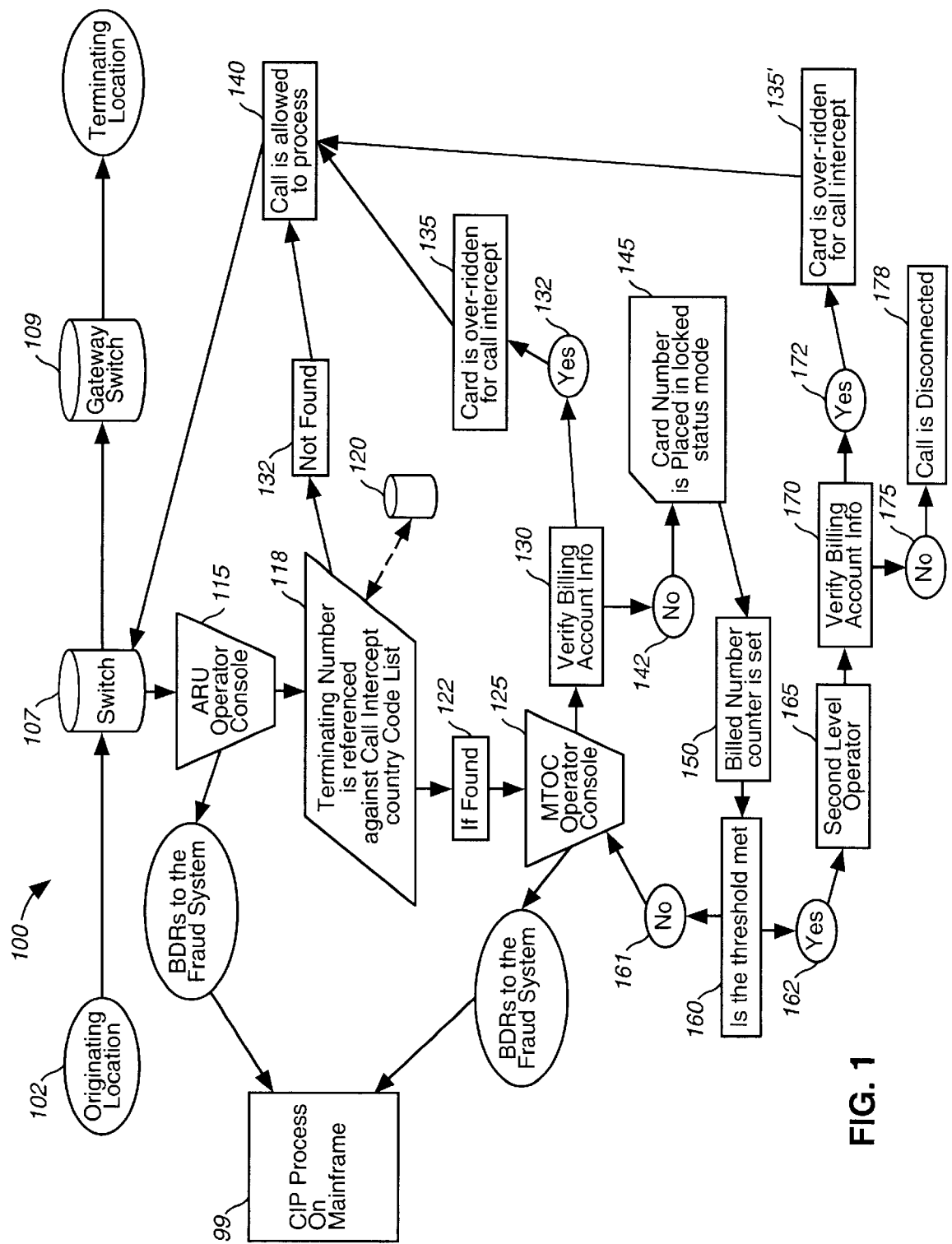
FIG. 1 illustrates a telecommunication system implementing the call intercept process for domestic origination to terminating international location call according to a first embodiment of the invention.

FIG. 1 illustrates the inventive system 100 implementing the call intercept process according to a first embodiment of the invention. In this first embodiment, the caller will dial a calling card access number from an originating domestic location 102. The call is received at a telecommunications switch 107 where it is directed to an automated response unit 115. The caller is then prompted to input a calling card and terminating number by the Automated Response Unit (ARU) 115, which is also referred to as the Automated Operator Console. At 118, the ARU will reference the terminating number against a Call Intercept Country table located in a Billed Number Screening database (BNS) 120. If the terminating number is not found in the Call Intercept Country table at 132, the card is allowed to process where it is routed via originating switch 107 through a gateway switch 109 to the destination. If the country code of the terminating number is found in the BNS Call Intercept Country table, as indicated at 122, the call is defaulted from the ARU to a Manual Transfer Operator Console (MTOC) 125, which is also referred to as the Manual Operator Console.

As indicated at 130, FIG. 1, the MTOC operator will then prompt the caller for the correct name and address as it appears on the billing account. If the caller provides correct information at 132, the card is over-ridden for call intercept by a Call Intercept Process (CIP) at 135, and the specific card is placed in the BNS database 120 to allow the card call to process, as indicated at step 140. That is, an 'Override' flag is associated with that calling card number to prevent an interception. If the caller provides incorrect name and address or disconnects the call at 142, the call is denied and the card is placed in an Intercept-Locked status mode by the CIP process as indicated at 145. That is, an 'Intercept-Locked' flag is associated with that calling card number so that future attempts made using that calling card will be defaulted to an operator. Thus, the next time the calling card number is used, regardless of the terminating location, the caller will be defaulted to a MTOC, where the operator will attempt to verify name and address.

In FIG. 1, as indicated at 150, a billing number counter is set, i.e., incremented, to track the number of calling card attempts using that calling card. If subsequent calling card call attempts fail a predefined number of times at the MTOC, as indicated at 160, 162, the caller is then transferred to a second level operator/customer service center, as shown at 165. Preferably, the calling call failure threshold is set at five (5) times but it is-understood that the threshold is configurable. If the calling call failure threshold is not met at step 161, the call is returned to the MTOC which generates the billing data record indicating the Intercept-Locked status mode for the database. Furthermore, the card number will remain in the BNS database assigned the Intercept-Locked status mode.

At step 170, after transference of the call to the second level operator, the operator will then attempt to verify the identity of the caller, e.g., billing account information pertaining to the calling card. At 172, if the caller provides the correct account information, the card is over-ridden for call intercept through the CIP process logic at 135', and the call is allowed to complete. Thus, the status flag associated with the calling card number is assigned the 'Override' flag to prevent a future interception. If the caller provides incorrect name and address at 175, the card number will stay placed in the BNS database under the Intercept-Locked status mode, and the call is disconnected at 178.

Figure 2:
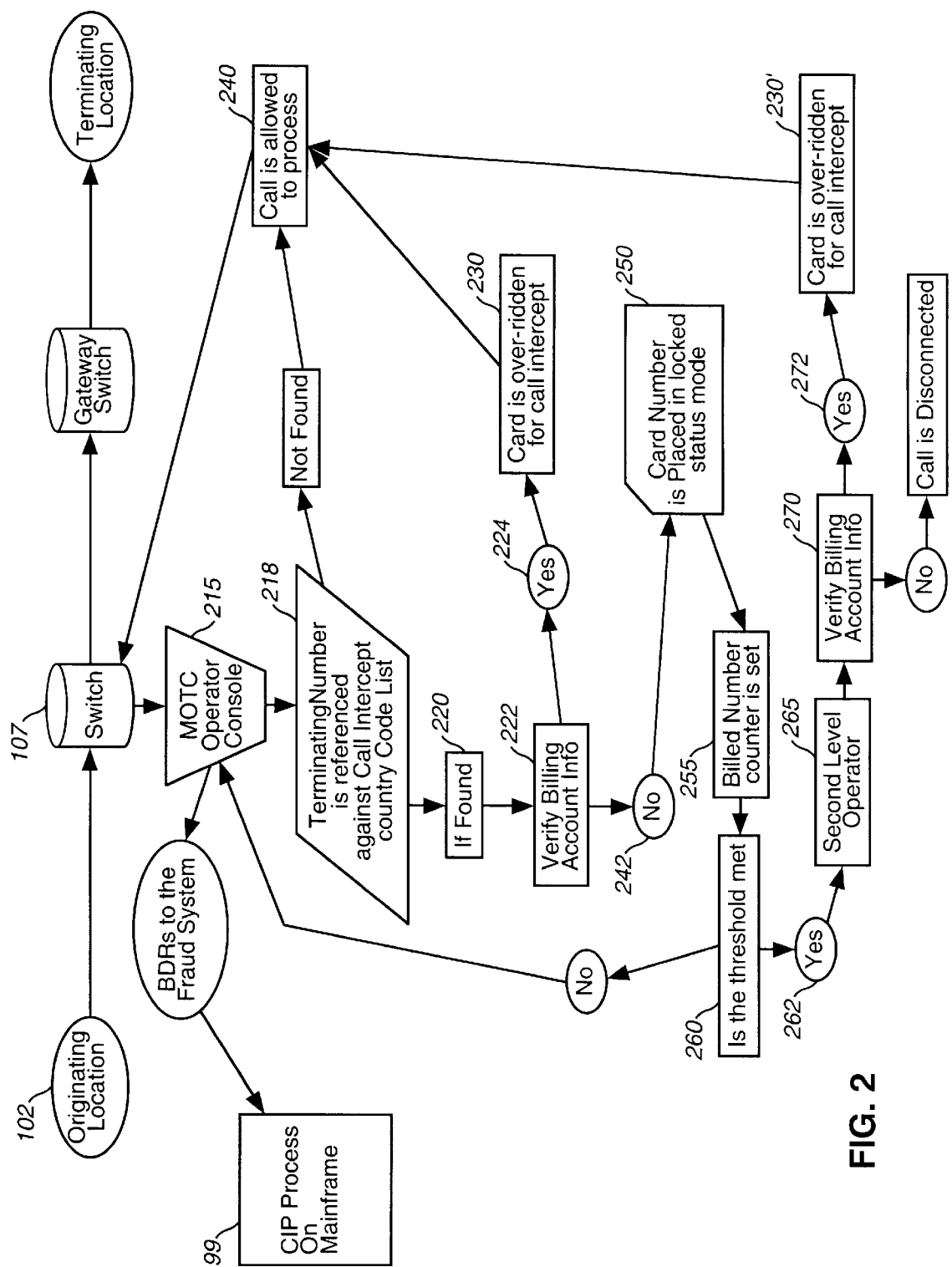
FIG. 2 illustrates a telecommunication system implementing the call intercept process for domestic origination to terminating international location call according to a second embodiment of the invention.

As shown in the process flow diagram of FIG. 2, a first calling card call attempt may first be routed to an MTOC via the switch 107, bypassing the ARU level of screening. After making a calling card call at 102, the MTOC operator will prompt the caller for calling card and desired terminating number at 215. At 218, the MTOC console will then reference the terminating number against the Call Intercept BNS Country table. If the country code of the terminating number is found at 220 in the Call Intercept BNS Country table, the MTOC operator will prompt the caller for correct name and address as it appears on the billing account at 222.

If the caller provides correct information at 224, the card is over-ridden for call intercept using the CIP logic at 210 and the call is allowed to process at 240 where it is routed to the terminating location via a gateway switch. That is, the calling card number is assigned the 'Override' status. If the caller provides incorrect name and address or disconnects the call at 242, the call is denied and the card is placed in the Intercept-Locked status mode via the CIP at 250. That is, the calling card number is assigned the 'Intercept-Locked', flag which will require further verification for subsequent calls made using that calling card number. Thus, the next time the calling card number is used, regardless of the terminating location, the MTOC operator will attempt to verify name and address.

Then, as indicated at 255, the billing number counter is incremented to track the number of calling card attempts using that calling card. If the caller fails a predefined number of times at the MTOC, as indicated at 260, 262, the caller is then transferred to a second level operator, as indicated at 265, where a 'Transfer to $2^{nd}$ level', flag is set. The second level operator will then attempt to verify the identity of the caller, i.e., verify billing account information pertaining to the calling card, as indicated at 270. At 272, if the caller provides the correct account information, the card is over-ridden for call intercept at 230' and the call is allowed to process (240). If the caller provides incorrect name and address at 275 or disconnects the call at 278, the card number will stay in Intercept-Locked status mode.

It is understood that a CIP Call Intercept process 99 is implemented to set the calling card in the different modes for Call Intercept. Particularly, as shown in FIGS. 1 and 2, the Call Intercept Process 99 is a mainframe program that, in real-time, receives data feeds, e.g., in the form of call detail or billing detail records, from the operator ARU 115 and MTOC 125 consoles. The data received from these records are populated with the unique 'Override' 'Intercept-locked' and 'Transfer to $2^{nd}$ level' flag values set to allow the CIP program to determine how to treat the calling card based on the outcome of the intercepted call. A list of the types of conditions that may occur at the operator platform, that result in the setting of the unique flags in the call record, is now provided. It is understood that, based on these flags, Call Intercept will set the calling card accordingly for treatment into the Billed Number Screening (BNS) database 120.

Figure 3:
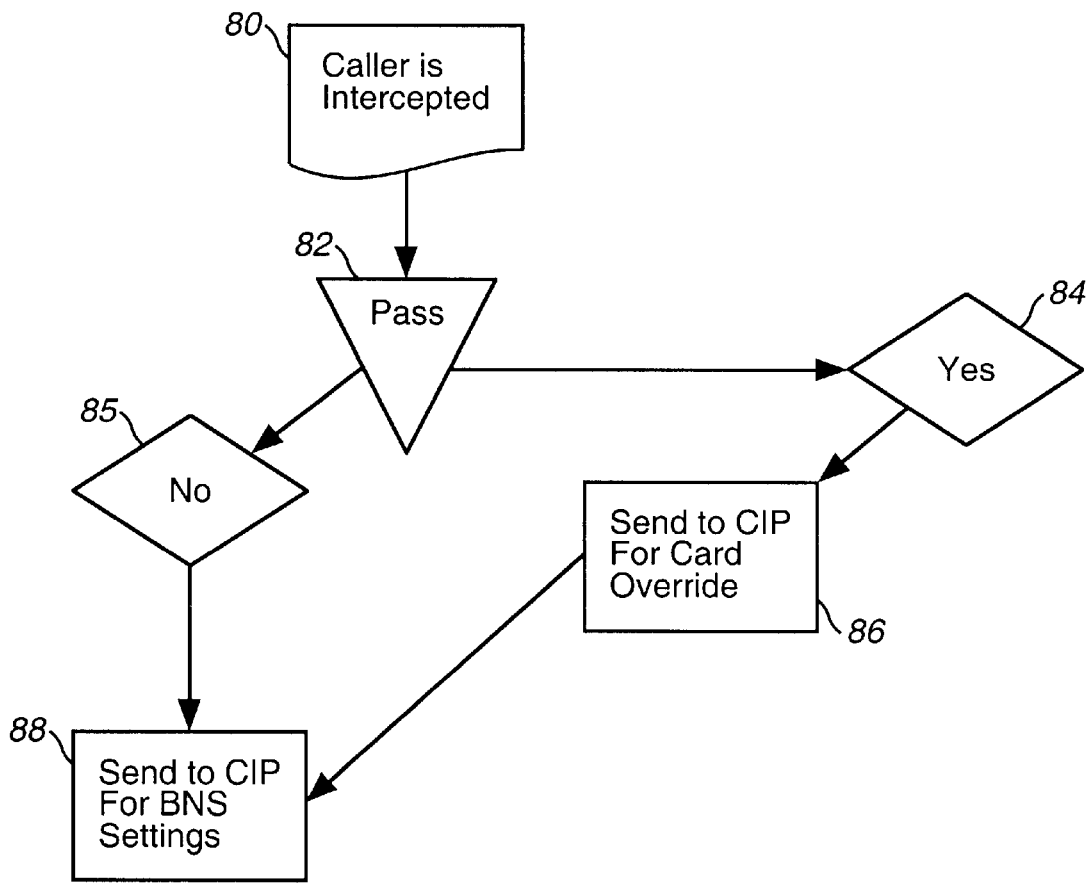
FIG. 3 is a flow diagram depicting the call intercept process mainframe program.

Particularly, as shown in the mainframe CIP process 80 of FIG. 3, at the first call intercept phase 82 initiated at the time a first calling card call is made, if the caller passed account verification at step 84, the CIP program 99 will set the flag on the card to 'Override' at step 86 and place the calling card in the BNS (Billed Number Screening) database 120 as indicated at step 88. This will allow any future calls to ignore this call from intercept treatment via the operator sites. If, at step 85, the caller fails account verification on first call intercept, or even disconnects before entering any information, the CIP program 99 will place the caller in the 'Locked Status Model' and update the call record in the BNS database with this flag setting (step 86). Any additional calls that take place on the card having this associated status, regardless of termination, will be intercepted.

The CIP program has a configurable counter that allows the callers to be routed to another operator group if the caller continues to fail call intercept over time. Once the counter meets or exceeds the pre-set threshold, the CIP program will place the card in BNS with a 'Transfer to $2^{nd}$ Level' flag set. All additional calls will be routed to the second level operator/customer service operator group regardless of where the caller dialed to terminate.

In each of the above cases, at anytime the caller passed account information, the caller is overridden from future intercepts.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

What is claimed is:

1. A method for detecting fraudulent calling card calls placed from an originating international location to a domestic termination, said method comprising:

a) receiving a calling card call placed from a domestic location at a switch capable of further routing a call to a desired international termination;

b) routing the calling card call to a first level operator for verifying billing account information corresponding to said calling card, said first level operator performing one of: processing said calling card call upon successful verification of billing account information, and terminating said call otherwise; wherein terminating said call upon verification failure includes associating a locked intercept status flag enabling further intercept for calls placed with said calling card number, and c) upon receipt of subsequent calling card call attempts from originating international locations, default routing of said calls to a first level operator for verifying billing account information corresponding to said calling card, said first level operator performing one of: processing said calling card call upon successful verification of billing account information, and terminating said call otherwise, limiting a number of subsequent calling card call attempts from originating domestic locations to international terminations upon failure of verification of billing account information; and, routing said calling card call to a second level operator for verifying identity of the caller after a pre-determined number of calling card call attempts, wherein limiting a number of subsequent calling card call attempts from originating domestic locations to international terminations upon failure of verification of billing account information, wherein said routing of said call to said second level operator further includes setting a transfer flag indicating future calls to be directed to said second level operator.

2. A hierarchical method for detecting fraudulent calling card calls placed from an originating domestic location to an international termination, said method comprising the steps of:

a) receiving a calling card call placed from an originating domestic location to a switch for further routing said call to a desired international termination;

b) providing first level of calling card fraud detection by automatically comparing a country code associated with said terminating location against a database comprising country codes and termination numbers predefined as being high fraud risk;

c) providing second level of calling card fraud detection by routing the calling card call to a first level operator if a match against said database is found and processing said call otherwise, said first level operator for verifying billing account information corresponding to said calling card and performing one of: terminating said calling card call when said billing information is not verified, and processing said calling card call upon successful verification of billing account information; and, d) upon each of a predefined number of subsequent attempts of calling card number calls placed from domestic originations, automatically routing said calls to a first level operator for verifying billing account information corresponding to said calling card, and processing said calling card call upon successful verification of billing account information, and terminating said call otherwise; and, e) after the predefined number of subsequent attempts have been made, routing said calling card call to a second level operator for verifying identity of the caller, said second level operator performing one of: terminating said calling card call when said caller identity is not verified, and processing said calling card call upon successful verification of caller identity.

* * * * *